Figure 1:
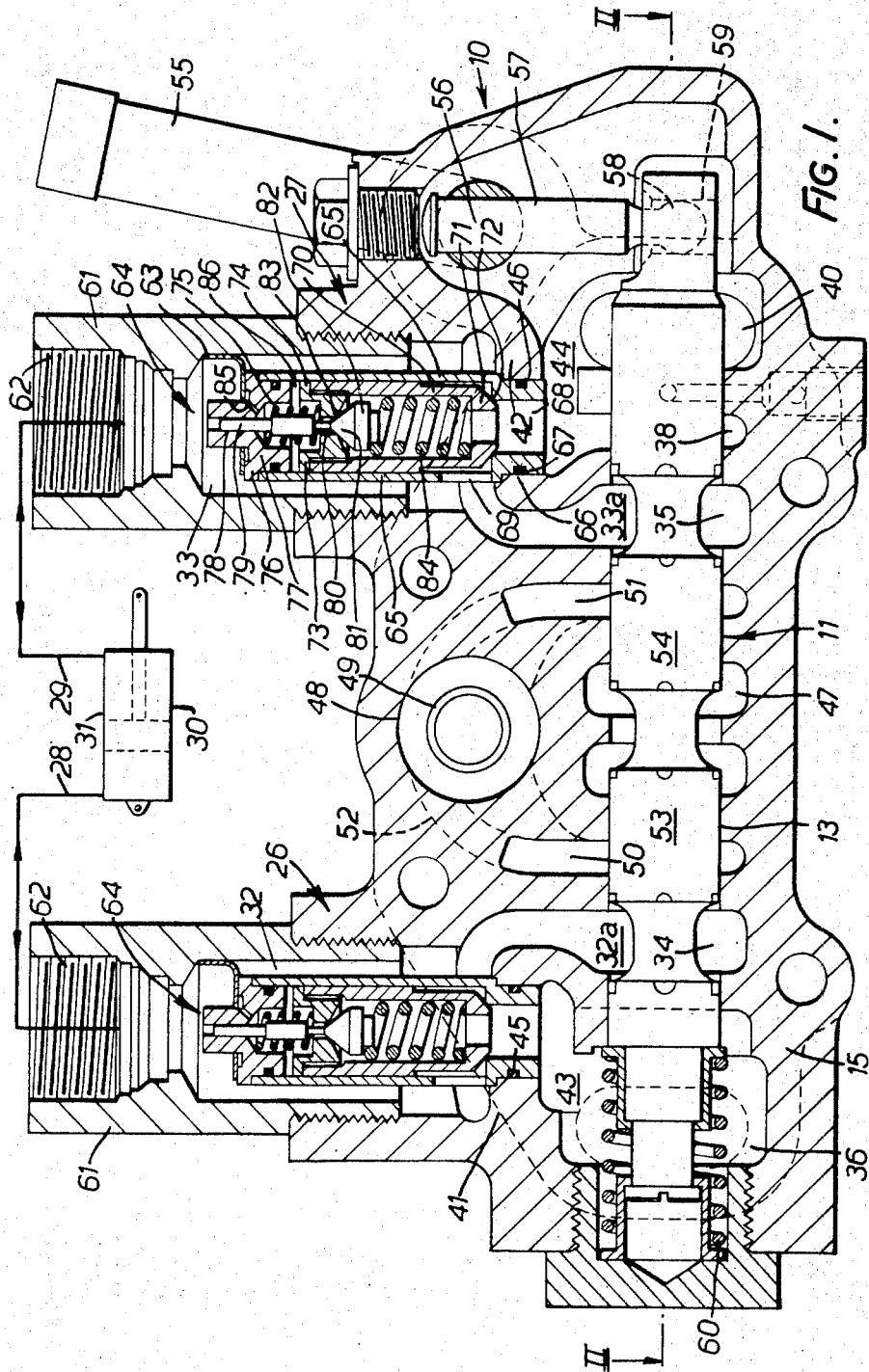

United States Patent [19]
Boydell

[11] 3,730,220
[45] May 1, 1973

[54] SELECTOR VALVES
[75] Inventor: Kenneth Raymond Boydell, Bredons Hardwicke, Tewkesbury, England
[73] Assignee: Dowty Technical Developments Limited, Brockhampton, Cheltenham, England
[22] Filed: Apr. 8, 1971
[21] Appl. No.: 132,479

[30] Foreign Application Priority Data
Apr. 24, 1970 Great Britian................19692/70

[52] U.S. Cl.............................................137/596.2
[51] Int. Cl.....F16k 31/36, F16k 31/12, F16k 17/26, F16k 17/32
[58] Field of Search..................137/596, 596.12, 137/596.13, 596.1, 596.2, 491, 493

[56] References Cited
UNITED STATES PATENTS

| | | |
|---|---|---|
| 3,194,261 | 7/1965 | Tennis..............................137/491 |
| 3,250,185 | 5/1966 | Tennis et al.......................137/596.2 |
| 3,506,031 | 4/1970 | Stacey.................................137/596 |
| 3,387,628 | 6/1968 | Flint et al. ......................137/596.12 |
| 3,460,567 | 8/1969 | Martin.................................137/596 |

Primary Examiner—Henry T. Klinksiek
Assistant Examiner—Robert J. Miller
Attorney—Young & Thompson

[57] ABSTRACT

A selector valve has a service passage, the fluid flow through which from an inlet connection of the valve to a service-line connection thereof is controlled by a movable valve element, a service-line relief valve assembly being provided substantially wholly within, and arranged lengthwise of, said service passage by which that passage can be placed in communication with an exhaust port of the valve when the fluid pressure in the passage exceeds a predetermined value.

10 Claims, 3 Drawing Figures

INVENTOR
KENNETH RAYMOND BOXDELL
BY Young & Thompson
ATTORNEYS

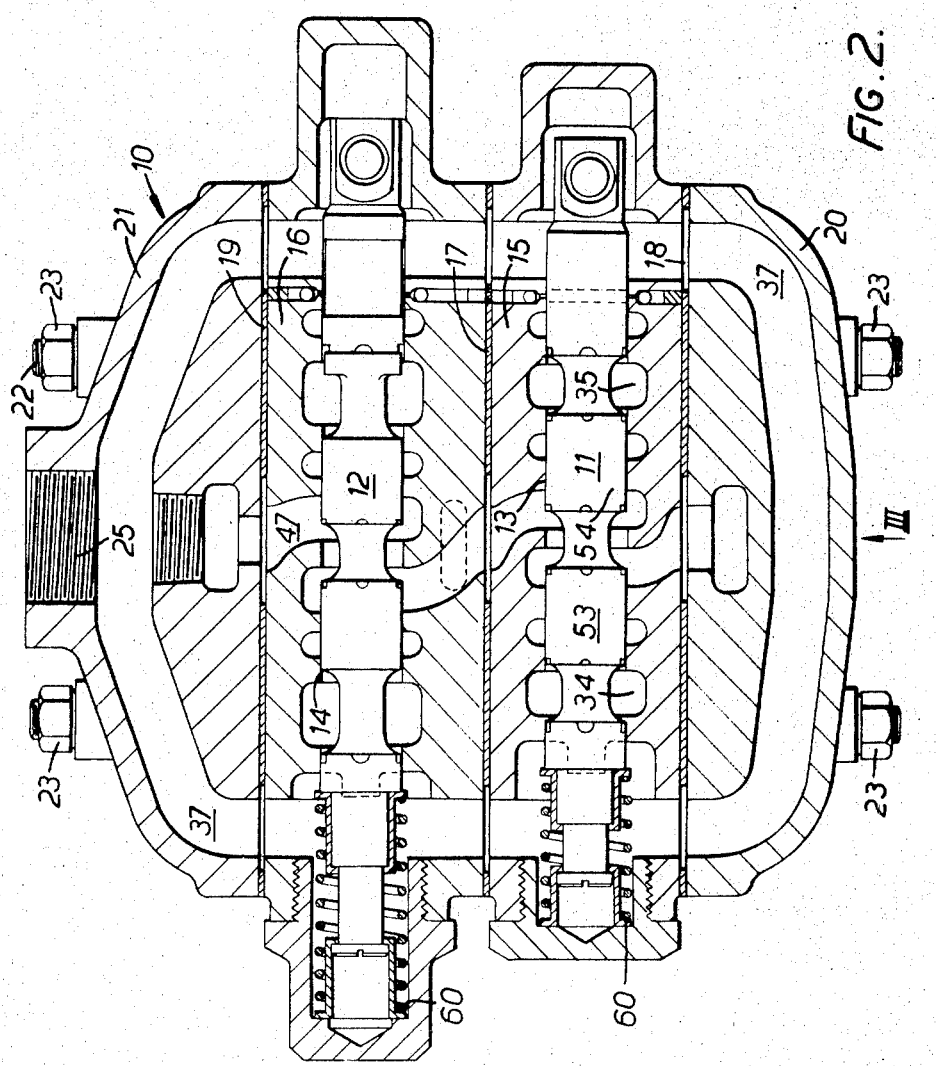

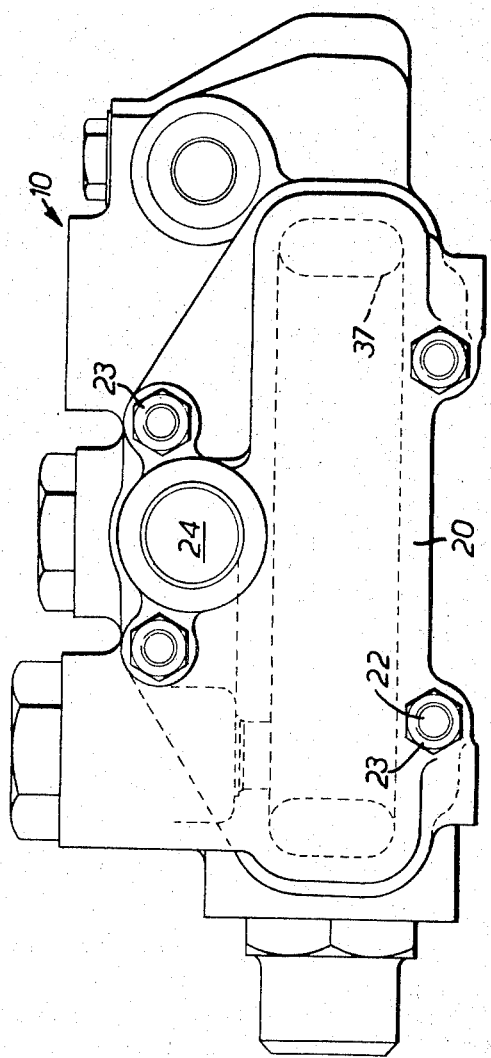

SELECTOR VALVES

This invention relates to selector valves suitable for use in fluid-pressure-operable systems.

According to this invention a selector valve includes a casing having a fluid inlet connection connectible to a supply of pressure fluid, a service-line port, a service passage extending from said port and terminating in a service-line connection which is connectible to a service, an exhaust port, a movable valve element co-operable with said service-line port for controlling flow of fluid from the inlet connection to said service passage, and a service-line relief valve assembly provided substantially wholly within, and arranged lengthwise of, said service passage, by which said passage can be placed in communication with said exhaust port when the fluid pressure in that passage exceeds a predetermined value.

Preferably a portion of said assembly seats in an aperture provided in a web portion of said casing formed between the service passage and an exhaust duct open to said exhaust port. The relief valve assembly may be of pilot-operated type.

Where the movable valve element controls a double-acting service, two of said service passages are provided with one of said relief valve assemblies in each of them.

The or each said assembly may include an anti-cavitation valve element operable to permit flow of fluid from said exhaust duct into said service passage upon any tendency for cavitation to occur in that passage and the associated service-line.

Where the or each said assembly is of pilot-operated type, the main valve element thereof may also be operable as said anti-cavitation valve element.

One embodiment of the invention will now be particularly described by way of example with reference to the accompanying drawings, of which, FIG. 1 is a cross-section of a selector valve having two parallel linearly-displaceable valve elements, FIG. 2 is a cross-section of the valve shown in FIG. 1 taken along the line II—II thereon, and, FIG. 3 is a front elevation of the valve shown in FIGS. 1 and 2 as viewed in the direction of the arrow III upon FIG. 2.

Referring to the drawings, a selector valve comprises a banked assembly 10 which includes two parallel valve elements in the form of spools 11 and 12 which are respectively slidable in bores 13 and 14 formed in respective casing plates 15 and 16. A gasket member 17 is provided between the mating faces of the casing plates 15 and 16, and further gasket members are provided at 18 and 19 respectively between the casing plates 15 and 16 and end closure casing plates 20 and 21.

The assembly of components is held together by through bolts 22 having nuts 23 at either end thereof.

The end closure casing plate 20 incorporates an inlet connection 24 as shown in FIG. 3, while the end closure casing plate 21 incorporates an exhaust connection 25 as shown in FIG. 2.

Each casing plate 15 and 16 includes a pair of service-line connections 26 and 27, as shown in FIG. 1, which are connectible to service-lines, diagrammatically shown at 28 and 29, which respectively connect with the left-hand and right-hand end portions of the cylinder 30 of a respective telescopic jack 31 which the respective spool 11, 12 is required to control.

The service-line connections 26, 27 open respectively into service passages 32, 33, formed in casing plates 15, 16, which in turn respectively open through service-line ports 32a, 33a to annuli 34, 35 formed in the respective spool bore 13, 14. To the left in FIG. 1 of the annulus 34, each bore 13, 14 has a further annulus 36 which is in open communication with a continuous exhaust trunk 37, open to the exhaust connection 25, which runs around the inside wall of the valve block, the major portions of the trunk 37 being formed in the end casing plates 20 and 21. To the right of the annulus 35 in FIG. 1 there is provided in each bore 13, 14 a further annulus 38 which connects through ducting with an annulus 40 which is in open communication with the trunk 37. In each casing plate 15, 16, webs of material which are parallel with the longitudinal axes of the bores 13 and 14, and which are shown at 41 and 42, separate the service passages 32 and 33 respectively from exhaust ducts 43 and 44, the latter communicating with the continuous exhaust trunk 37.

Apertures 45 and 46 are formed in the webs 41 and 42.

In conventional manner the valve assembly is provided with an open-center passage generally indicated at 47, comprising porting and annuli, which place the inlet connection 24 in direct communication with the exhaust connection 25 when the two spools 11 and 12 are in their neutral positions as shown in FIG. 2. Whenever either one of the spools 11 or 12 is moved to the left or to the right of the neutral position to a service-selecting position, the open-center passage 47 is blocked, so that liquid under pressure delivered by a suitable pump to the inlet connection 24 no longer passes directly to the exhaust connection 25, but is instead directed into a duct 48 and through respective check valves diagrammatically shown at 49 into both limbs 50 and 51 of a U-passage 52 associated with each respective spool 11, 12. In this way, liquid under pressure can pass from whichever of the passages 50 and 51 is opened by the spool lands 53 and 54 to the service passages 32 or 33. At the same time that service passage which is not pressurized in placed by the appropriate land of the spool in open communication with the exhaust trunk 37. Hence, the respective jack 31 is extended or contracted as the case may be.

Each spool is manually operable by means of its control lever 55 whose angular displacement about an axis 56 angularly displaces a short rod 57 having a ball end 58 which engages an aperture 59 in the right-hand end portion of the respective spool. In this way, linear movement is imparted to the spool within its bore. Spring-centering means 60 are provided in association with each spool to bias the spool towards the neutral position as shown in FIGS. 1 and 2.

As shown in FIG. 1, each of the service-line connections 26 and 27 has a screw-threaded adaptor 61 fitted therein and the conduits 28 and 29 are respectively screwed into the internally-threaded portion 62 of its adaptor.

Each adaptor is provided with a spacer member 63 which supports the upper end portion of a service-line relief valve cum anti-cavitation valve assembly 64. This assembly comprises a cylindrical member 65 which is stepped at 66 at its lower end portion to seat in the respective aperture 45, 46 in the webs 41, 42. A suitable sealing ring 67 is provided at this position and a port 68 opens from the interior of the member 65 into the adjacent exhaust duct 43, 44. A port 69 is provided in the cylindrical wall of the member 65, placing the interior of the member in communication with the respective service passage 32, 33. A main valve element 70, of hollow form and having a frusto-conical end portion 71, seats upon the upper end portion 72 of the port 68. The upper end portion of the main valve element 70 is provided with a stepped plug 73, the flanged portion 74 of which is urged against the upper end face of the element 70 by a coil spring 75. At its end portion remote from the plug 73 the coil spring 75 engages a closure member 76 which has a sealed spigot portion 77 engaging the upper end portion of the cylindrical member 65. The member 76 is provided with a bore 78 of small diameter whose axis is coincident with that of the member 65. This bore houses a sliding plunger 79 which extends downwardly in the drawing and projects into a pilot valve port 80 to engage the nose portion 81 of a conical pilot valve element 82 which, when closed, seats upon a seating 83 at the lower end of the port 80. The pilot valve element 82 is urged onto its seating 83 by a coil spring 84. A small drilling or bleed 85 is provided in the member 76 which places the service-line 29 in communication with the chamber 86 formed between the plug 73 and the member 76.

When, during operation of the selector valve, either of the spools 11 or 12 selects the operation in either direction of a respective jack 31, it is essential that the pressure in the pressurized service-line 28 or 29 does not exceed a predetermined safe maximum value. The service-line relief valves are provided for this purpose and when the pressure in the service-line 28 or 29 approaches the said predetermined value, the pressure in the chamber 86 rises and the pilot valve element 82 is unseated. This results in release of liquid from the chamber 86 into the port 68 and thus into the exhaust duct 43 or 44. The consequent lowering of pressure in the chamber 86 causes an increase in the pressure differential across the main valve element 70, so that this element overbalances its spring 75 and lifts from the seating 72. Liquid under the elevated pressure in the respective service passage 32 or 33 is placed in communication with the exhaust duct 43 or 44 as the case may be. The plunger 79 senses service-line pressure on its upper face and maintains a load on the element 82 proportional to service-line pressure.

As soon as the pressure in the service-line has fallen to an acceptable value, the plunger 79, in sensing this new condition, moves upwardly in the drawing allowing the pilot valve element 82 to reseat. Hence, liquid passing into the chamber 86 through the bleed 85 builds up to a pressure which reduces the pressure differential across the main valve element 70 so as to restore that element to its seated position.

In its anti-cavitation valve role, the assembly 64 is operable to allow liquid to pass from the respective exhaust duct 43, 44 into the service-line 28, 29 when, due to certain external loading conditions on the jack 31, the pressure in one or other of the service-lines drops below that in the respective exhaust duct, such drop otherwise giving rise to cavitation in the service-line.

The main valve element 70 acts as the displaceable member of the anti-cavitation valve, being subjected on one side to the pressure pertaining in the exhaust duct 43, 44 and on the other side to the pressure pertaining in the service-line 28, 29. When the pressure differential across the element in this sense exceeds a predetermined value, the coil spring 75 is overbalanced and the element 70, together with its stepped plug 73 and the pilot valve element 82 and spring 84, together move bodily upwardly in FIG. 1. The plunger 79 also slides upwardly in its bore 78. Since the valve element 70 is now raised from its seating 72, liquid in the exhaust duct 43, 44 can pass into the service-line 28, 29 to overcome the cavitational tendency therein.

By so providing service-line relief cum anti-cavitation valves actually in the service passages of the selector valves, it is not necessary, as was the case hitherto, to provide enlarged casing sections separately to accommodate the service-line relief cum anti-cavitation valves alongside the service-line connections. The latter placing of service-line valves resulted in a casing construction of a heavier nature, this being detrimental to overall compactness because the respective spool control levers required them to be mounted further outwardly of the spool housings to avoid coming into contact with the relief valve structure.

Therefore by providing the relief cum anti-cavitation valve assemblies actually in the service passages, greater flexibility for installation of the selector valves is achieved.

Although in the embodiment above described with reference to the drawings the service-line relief valves described are of pilot-operated type and combined with anti-cavitation valves, in alternative embodiments of the invention, the relief valves may not be so combined. Further, they need not be of pilot-operated type but instead be of single-stage type.

In cases where at any particular position in a bank of selector valves service-line relief valves are not required, they are each then simply omitted and a suitable plug is used to close the aperture provided in the respective web of material between the service passage and the exhaust duct.

The invention is in no way limited to selector valves of the banked type, as it may well be applied to selector valves having a single displaceable valve element.

Further, the invention is in no way limited to selector valves of the banked type comprising sections held together in stacked relation, as in other embodiments the casing may be of the monobloc type.

Again, although in the embodiment described with reference to the drawings the selector valve elements are of spool type and linearly slidable, in other embodiments of the invention the displaceable elements of the selector valves may be of rectangular cross-section and slidable either linearly or in the rotational sense in their respective casing parts.

The invention is not limited to selector valves of the open-center type as hereinbefore described, as in other embodiments it is instead with advantage applied to selector valves of the non-open-center type.

I claim:

1. A selector valve including a casing having a fluid inlet connection connectible to a supply of pressure fluid, a service-line connection connectible to a service, a service-line port, a service passage extending directly from said service-line port to said service-line connection, an exhaust port, a movable valve element co-operable with said service-line port for controlling flow of fluid from the inlet connection to said service passage, and a service-line relief valve assembly, said assembly including a ported hollow member which has a relief valve seating and an associated relief valve port, which houses a displaceable relief valve element engageable with said seating, and which is mounted substantially wholly within, and arranged lengthwise of, said service passage, and said ported hollow member being of substantially smaller overall transverse cross-sectional dimension than the part of said service within which it is disposed whereby a portion of said service passage is provided which substantially surrounds the ported hollow member and which opens directly to said service-line connection, and the displaceable relief valve element being disengageable from said seating when the fluid pressure in said service passage exceeds a predetermined value to place that passage in communication with said exhaust port by way of the porting in said ported hollow member.

2. A selector valve including a casing having a fluid inlet connection connectible to a supply of pressure fluid, a service-line connection connectible to a service, a service-line port, a service passage extending directly from said service-line port to said service-line connection, an exhaust port, a movable valve element co-operable with said service-line port for controlling flow of fluid from the inlet connection to said service passage, and a service-line relief valve assembly, said assembly including a ported hollow member, of cylindrical form, which has a relief valve seating and an associated relief valve port, which houses a displaceable relief valve engageable with said seating, and which is mounted substantially wholly within, and arranged lengthwise of, said service passage, and said ported hollow member being of substantially smaller external diameter than the part of said service passage within which it is disposed whereby to provide a portion of said service passage around the ported hollow member which is of annular cross-section and which opens directly to said service-line connection, and spacer means being provided for maintaining the relief valve assembly spaced from the wall of the service passage, and the displaceable relief valve element being disengageable from said seating when the fluid pressure in said service passage exceeds a predetermined value to place that passage in communication with said exhaust port by way of the porting in said ported hollow member.

3. A selector valve as claimed in claim 2, wherein said ported hollow member seats in an aperture provided in a web portion of said casing formed between the service passage and an exhaust duct open to said exhaust port.

4. A selector valve as claimed in claim 2, wherein said relief valve assembly is of pilot-operated type.

5. A selector valve as claimed in claim 2, wherein where the movable valve element controls a double-acting service, two of said service passages are provided with one of said relief valve assemblies in each of them.

6. A selector valve as claimed in claim 3, wherein said displaceable relief valve element is also operable as an anti-cavitation valve element to permit flow of fluid from said exhaust duct into said service passage upon any tendency for cavitation to occur in that passage and the associated service-line.

7. A selector valve as claimed in claim 6, wherein the relief valve assembly is of pilot-operated type, the main valve element thereof being operable as said anti-cavitation valve element.

8. A selector valve as claimed in claim 2, wherein said movable valve element is of spool type.

9. A selector valve as claimed in claim 2, wherein said selector valve is of open-center type.

10. A selector valve as claimed in claim 4, wherein the pilot stage of said relief valve assembly comprises a spring-loaded pilot valve element which is engaged by a plunger, the end face of said plunger remote from said pilot valve element being subjected to said fluid pressure in said service passage, and said plunger moving to open said pilot valve element against its spring load when said fluid pressure exceeds said predetermined value.

* * * * *

UNITED STATES PATENT OFFICE
CERTIFICATE OF CORRECTION

Patent No. 3,730,220　　　　　Dated May 1, 1973

Inventor(s) KENNETH RAYMOND Boydell

It is certified that error appears in the above-identified patent and that said Letters Patent are hereby corrected as shown below:

Column 2, line 46, "in" should read -- is -- . Column 5, line 13, after "service", insert -- passage -- ; line 35, after "relief valve", insert -- element -- .

Signed and sealed this 20th day of November 1973.

(SEAL)
Attest:

EDWARD M.FLETCHER,JR.　　　　RENE D. TEGTMEYER
Attesting Officer　　　　　　　Acting Commissioner of Patents